(12) United States Patent
Varakin

(10) Patent No.: US 12,299,032 B2
(45) Date of Patent: May 13, 2025

(54) SYSTEM AND METHODS FOR SUMMARIZING TRANSCRIBED AUDIO

(71) Applicant: Verint Americas Inc., Alpharetta, GA (US)

(72) Inventor: Konstantin Varakin, Alpharetta, GA (US)

(73) Assignee: Verint Americas Inc., Alpharetta, GA (US)

( * ) Notice: Subject to any disclaimer, the term of this patent is extended or adjusted under 35 U.S.C. 154(b) by 285 days.

(21) Appl. No.: 17/930,880

(22) Filed: Sep. 9, 2022

(65) Prior Publication Data

US 2024/0086461 A1   Mar. 14, 2024

(51) Int. Cl.
*G06F 16/683* (2019.01)
*G06F 40/284* (2020.01)
*G06F 40/40* (2020.01)

(52) U.S. Cl.
CPC .......... *G06F 16/685* (2019.01); *G06F 40/284* (2020.01); *G06F 40/40* (2020.01)

(58) Field of Classification Search
CPC ...... G06F 16/685; G06F 40/35; G06F 40/284; G06F 40/40; G06F 16/345; G10L 15/22; G10L 15/187; G10L 15/26
See application file for complete search history.

(56) References Cited

U.S. PATENT DOCUMENTS

2020/0175987 A1* 6/2020 Thomson ................. G10L 15/26
2021/0407511 A1* 12/2021 Wyss ....................... H04M 3/51

OTHER PUBLICATIONS

Banerjee et al. (Multimedia Text Summary Generator for Visually Impaired | IEEE Conference Publication, Aug. 2, 2021) https://ieeexplore.ieee.org/document/9488968 (Year: 2021).*

* cited by examiner

*Primary Examiner* — Yogeshkumar Patel
(74) *Attorney, Agent, or Firm* — Meunier Carlin & Curfman LLC

(57) ABSTRACT

A system and method use a trained transformer model to generate summaries of audio interactions based on keywords. Training the transformer model includes obtaining a transcription of an audio interaction, obtain keywords for summarizing the audio interaction, training a transformer model to generate a summary of the audio interaction based on the keywords and the transcription, where the transcription is an input to the transformer model and the keywords are injected between an encoder and a decoder of the transformer model, and deploying the trained transformer model to be used for generating summaries of subsequent audio interactions.

20 Claims, 7 Drawing Sheets

SYSTEM AND METHODS FOR SUMMARIZING TRANSCRIBED AUDIO

FIELD

The present disclosure generally relates to a system and method for generating summaries of transcribed audio interactions.

BACKGROUND

Customer service agents often interact with dozens of customers each day through various communication channels, such as voice calls (e.g., via telephone), chats, emails, etc. In some cases, records of interactions between customer service agents and customers may be created for training and analysis (e.g., to review customer service procedures). Customer service agents that field telephone calls from customers may have their interactions transcribed, for example, to be reviewed and/or evaluated during or after a call.

SUMMARY

One implementation of the present disclosure is a system that includes one or more processors and memory having instructions stored thereon that, when executed by the one or more processors, cause the system to obtain a transcription of an audio interaction, obtain keywords for summarizing the audio interaction, train a transformer model to generate a summary of the audio interaction based on the keywords and the transcription, where the transcription is an input to the transformer model and the keywords are injected between an encoder and a decoder of the transformer model, and deploy the trained transformer model to be used for generating summaries of subsequent audio interactions.

Another implementation of the present disclosure is a method that includes obtaining a transcription of an audio interaction, obtaining keywords for summarizing the audio interaction, training a transformer model to generate a summary of the audio interaction based on the keywords and the transcription, where the transcription is an input to the transformer model and the keywords are injected between an encoder and a decoder of the transformer model, and deploying the trained transformer model to be used for generating summaries of subsequent audio interactions.

Yet another implementation of the present disclosure is a method of summarizing audio interaction. The method includes obtaining a transcription of an audio interaction, generating a plurality of candidate summaries for the audio interaction using a trained transformer model, where the transformer model is trained to generate the plurality of candidate summaries based on keywords that are injected between an encoder and a decoder of the transformer model, and presenting at least one of the plurality of candidate summaries to a user.

Additional features will be set forth in part in the description which follows or may be learned by practice. The features will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

Various aspects and features of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1A:
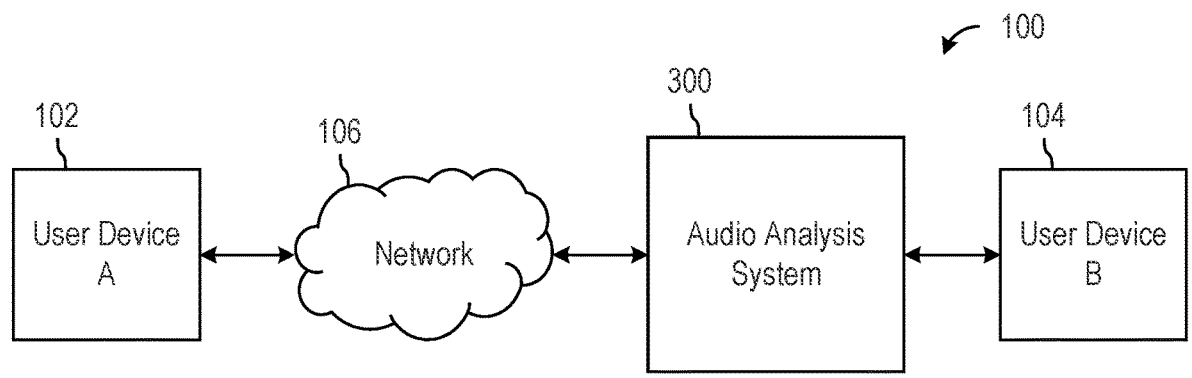
FIGS. 1A and 1B are block diagrams of a communication architecture between two or more devices, according to some implementations.

Referring generally to the figures, a system and methods for summarizing audio interactions between two or more persons are shown, accordingly to various implementations. An "audio interaction," as described herein, may be any verbal communication between two or more persons, such as a customer service agent and a customer; however, it should be appreciated that the system and methods described herein can also summarize written interactions (e.g., chat messages, emails, etc.). As an example, a phone call between a customer service agent and a customer may be an audio or text-based interaction. The system described herein may record and/or transcribe audio interactions, and then may generate one or more summaries of the interaction. Automatically summarizing interactions can save customer service agents time by quickly providing easy-to-understand overviews of the interaction(s). Further, summaries of interactions can be stored for more robust record keeping (e.g., for auditing purposes) and can be shared with other users (e.g., managers or supervisors, company executives, etc.) to evaluate customer service procedures, agent performance, customer sentiment, etc.

While some current technologies are capable of recording and/or transcribing audio interactions, there remains a need for automatic audio interaction summarization. Further, it would be beneficial to generate summaries that are tailored to individual user preferences, or preferences of a business having particular product lines or providing particular services. For example, a customer service agent may require different information in a summary for different types of products or related to different types of services. In a company setting, as another example, different departments may request/prefer different summaries tailor to each department's function. Accordingly, the system and methods described herein can generate a plurality of different candidate summaries for each audio interaction that account for these types of user preferences. In particular, different candidate summaries can be generated based on one or more keywords or phrases such that each of the different candidate summaries is based on the corresponding keyword or phrase.

As an example, suppose a transcribed audio interaction reads: "Tel-Aviv is a major city in Israel. Hummus is a famous food in Israel." The system described herein may generate multiple different summaries, such as "Tel-Aviv is in Israel." However, by incorporating a keyword, "food," the system may produce a tailored summary that reads "hummus is an Israeli food." In this manner, multiple tailored audio interaction summaries can be generated that account for user- or business-specific preferences. As described in greater detail below, keywords may be automatically obtained by analyzing transcribed audio interactions and/or may be provided by users. Additional features of the system and methods described herein are also described in greater detail below.

Overview

Figure 1B:
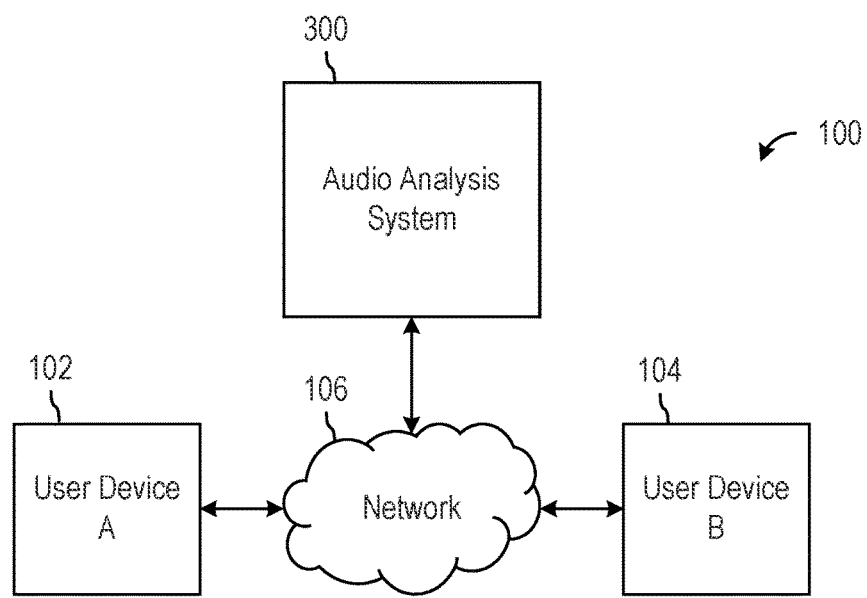

Referring generally to FIGS. 1A and 1B, block diagrams of an example communication architecture 100 are shown, according to some implementations. In particular, communication architecture 100 represents an interaction between two or more users, each operating a respective computing device shown as user devices 102, 104. In one example, user devices 102, 104 can represent telephones or smartphones operated by respective users (e.g., a customer and a customer service agent); however, it should be appreciated that user devices 102, 104 may be any computing device that can send and/or receive data, such as telephones, personal computers, servers, smartphones, smart watches, tablets, and the like. While generally described herein as computing devices operated by human users, in some implementations, one of user devices 102, 104 may operate with minimal to no human intervention. For example, user device 104 may host a chatbot (e.g., a customer service chatbot) that communicates with a user of user device 102. While communication architecture 100 is shown to only include two user devices 102, 104, for the sake of clarity and simplicity, it should also be appreciated that any number of computing devices may be used. For example, multiple users may join a single call from respective computing devices (e.g., a conference call).

As generally shown in FIGS. 1A and 1B, user device 102 can communicate with user device 104 via a network 106. As described herein, network 106 may represent any suitable type of communication network, e.g., a network over which data can be communicated between two or more devices. Generally, network 106 is a telecommunications network, such as a cellular network, a telephone network, a radio network, an intranet, the Internet, etc. In some implementations, network 106 represents a mixture of network types. For example, user device 102 may communicate via a cellular network while user device 104 communicates via the Internet. In some such implementations, other remote computing devices (e.g., servers), which are not shown, may handle the transfer of data between network types. It should be appreciated that network 106 is not limited to the examples provided herein.

Turning now to FIG. 1A, a first example configuration of communication architecture 100 is shown, according to some implementations. In this configuration, an audio analysis system 300 is shown to be positioned between user devices 102 and 104. It should be appreciated that system 300 is not necessarily physically located between user devices 102, 104, but that data communicated from user device 102 may pass through system 300 before reaching user device 104, and vice versa. In other words, system 300 can act as an intermediary between user devices 102, 104. In some such implementations, system 300 and user device 104 may be portions of a larger system, such as a call center computing system for a company or business. For example, system 300 and user device 104 may both be communicably coupled to a company's internal network (e.g., intranet) or server such that data can be routed to one or both of system 300 and user device 104 by a network switch, the server, etc. In some implementations, user device 104 is a part of system 300. Additional details of the system 300 are described below with reference to FIGS. 2-3.

In contrast, FIG. 1B shows a second example configuration in which system 300 is not directly in the communication path of user devices 102, 104. Rather, system 300 is communicably coupled to network 106 such that data transmitted between user devices 102, 104 is intercepted. For example, system 300 may indirectly record data transmitted between user devices 102, 104 for further analysis. It should be appreciated that the two configurations shown in FIGS. 1A and 1B are not intended to be limiting. In fact, system 300 may be communicably coupled with user device 102, user device 104, and/or network 106 in any other manner, such that system 300 can record and/or otherwise receive data transmitted between user devices 102, 104. For example, in some implementations, communications between user devices 102, 104 may be recorded by a separate device (e.g., a recorder) and subsequently stored and/or transmitted to system 300 for analysis; all such implementations are contemplated herein.

As will be described in greater detail below, system 300 is generally configured to obtain (e.g., by recording or receiving) data relating to interactions between users of user devices 102, 104. Generally, these "interactions" are audio interactions between two or more users; however, other types of interactions (e.g., emails, text messages, chats, etc.) between users of user devices 102, 104 are contemplated herein. An audio interaction may be any interaction in which users of user devices 102, 104 communicate verbally. Phone calls, for example, are audio interactions, as well as video calls, voice memos, etc. In some implementations, system 300 is configured to transcribe received audio data. In other implementations, system 300 receives a transcription of the audio interaction that is generated by another computing device (e.g., a call recorder, as described below).

Using FIG. 1A as an example, user device 102 may be a telephone or smartphone operated by a first user, who may be a customer of "Company A." The first user may initiate an audio interaction with a second user (e.g., an employee of "Company A") by calling Company A's customer service line, which connects user device 102 with user device 104, operated by the second user, via network 106. During or after the call, system 300 or another computing device (e.g., an on- or off-premise recorder) records the audio interaction and generates a transcription of the audio interaction. System 300 may then generate summaries of the audio interaction, which can be presented to the second user and any additional users (e.g., other employees of Company A). In particular, as described in detail below, system 300 generates tailored summaries that account for user preferences by generating the summaries using keywords or phrases.

Figure 2:
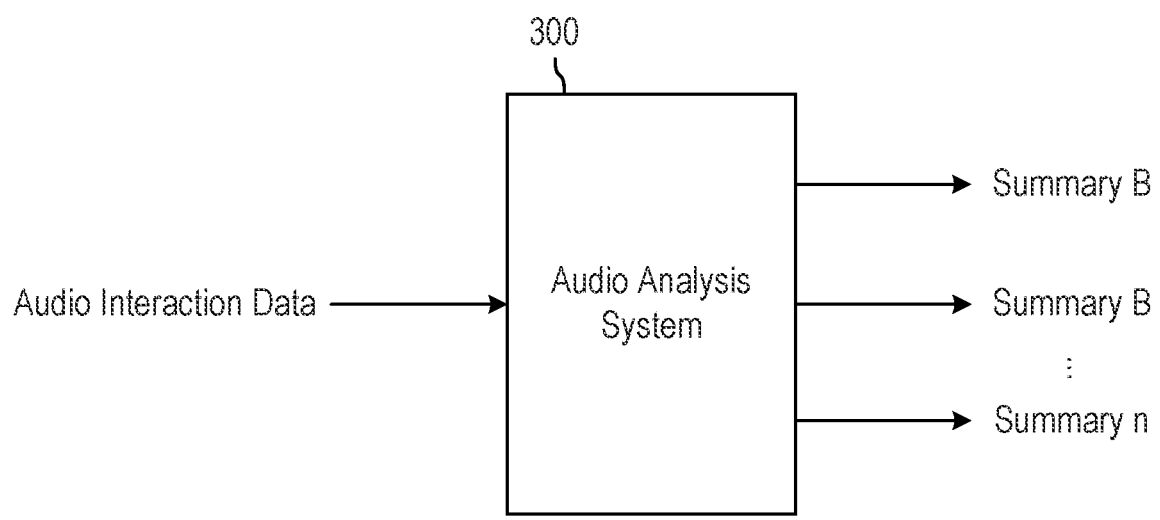
FIG. 2 is a block diagram illustrating the summarization of an audio interaction, according to some implementations.

Referring now to FIG. 2, in addition to FIGS. 1A and 1B, a block diagram illustrating the summarization of an audio interaction by system 300 is shown, according to some implementations. In particular, FIG. 2 illustrates a detailed example of system 300 generating multiple summaries for a given audio interaction. As shown, audio interaction data may be first received by system 300. As mentioned above, the audio interaction data can include a recording of an audio interaction and/or a transcription of the audio interaction. In cases where system 300 receives only an audio recording, system 300 may first transcribe the audio interaction before further analysis. Likewise, if data for a text-based interaction is received (e.g., a log of a chat conversation), system 300 may generate one or more summaries of the text-based interaction.

At a high level, system 300 generates a plurality of candidate summaries (e.g., 'Summary A,' 'Summary B,' . . . , 'Summary n') by running the transcription of the interaction through a transformer model, as will be described below with reference to FIG. 3. However, rather than generating generic summaries, system 300 is configured to generate tailored summaries based on one or more keywords or phrases such that the resulting summaries are tailored to various user- or business-defined preferences, as mentioned above. In some implementations, system 300 automatically extracts keywords from the transcribed interaction. In other implementations, system 300 references a list or database of previously-defined keywords and phrases for generating the summaries. For example, each department within a business may define a unique set of keywords for tailoring interaction summaries. In any case, system 300 can "inject" the keywords/phrases between an encoder and a decoder of the transformer model to generate tailored summaries, as will be described in greater detail below with respect to FIGS. 3 and 4. Subsequently, the generated summaries can be presented to one or more users, such as by transmitting the summaries to user devices associated with each of the one or more users, by displaying the summaries via one or more user interfaces, etc.

Audio Analysis System

Figure 3:
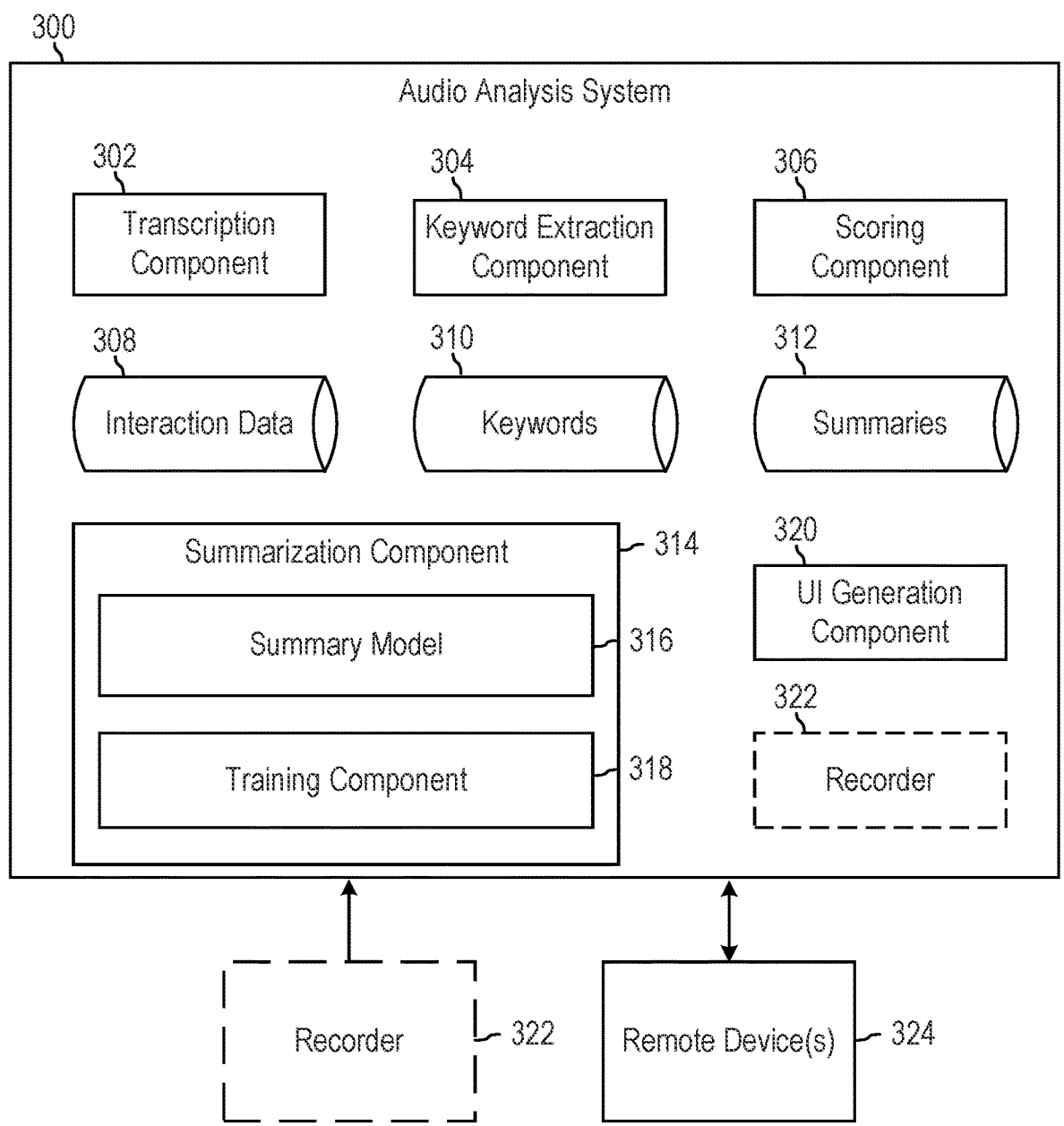
FIG. 3 is a detailed block diagram of an audio analysis system, according to some implementations.

Referring now to FIG. 3, a detailed block diagram of audio analysis system 300 is shown, according to some implementations. As described above, system 300 is generally configured to receive or collect audio interaction data, which is processed to generate one or more summaries of the audio interaction. In some implementations, system 300 includes a recorder 322 that records audio interactions, such as phone calls. With reference to FIG. 1A, for example, audio data may be passed through system 300, where it is recorded by recorder 322, before being transmitted to a target device (e.g., one of user devices 102, 104). Alternatively, with reference to FIG. 1B, recorder 322 may create a record of audio data that is intercepted by system 300 indirectly. As shown in FIG. 3, recorder 322 may be a component of system 300, according to various implementations. For example, recorder 322 may be implemented as a software program which records audio data as it is passed through system 300.

In some implementations, recorder 322 is a separate computing device for recording audio, which is also shown FIG. 3 for clarity. As an example, recorder 322 may be an on-premise or cloud-based recorder, as described in U.S. Provisional Patent App. No. 63/328,308, filed Apr. 18, 2022, which is incorporated herein by reference in its entirety. In some such implementations, where recorder 322 is external to system 300, audio data may be collected and preprocessed by recorder 322 to produce a transcription of an audio interaction. In other words, recorder 322 may be configured to transcribe audio data and may transmit a transcription, rather than a recording of the audio interaction itself, to system 300. However, it should be appreciated that, in other implementations, recorder 322 merely records the audio data, which is then sent to system 300 for further analysis. In some implementations, system 300 may both include recorder 322 and may receive audio data from an external recorder. For example, system 300 may record certain local audio interactions while also receiving audio data from external devices (e.g., recorder 322).

In some implementations, audio interaction data (e.g., recorded audio and/or transcriptions of audio interactions) is received from one or more remote devices 324, such as in addition to, or in place of, recorder 322. Remote devices 324 may be any computing devices that are remote (e.g., external) to system 300. For example, remote devices 324 may be computer systems, workstations, servers, and the like. In some implementations, remote devices 324 are computing devices operated by one or more users. For example, remote devices 324 may include multiple personal computing devices (e.g., smartphones, laptops, etc.) used by multiple users. In this manner, remote devices 324 allow users to interact with system 300 remotely (e.g., directly or through network 106). In some implementations, as described in greater detail below, system 300 is configured to transmit data (e.g., interaction summaries) to one or more of remote devices 324, which can cause remote devices 324 to perform various actions (e.g., generate and display a user interface).

In some implementations, when audio interaction data is received (e.g., from recorder 322 or another external device) or captured (e.g., by recorder 322), it may be stored in an interaction database 308, which maintains historical and newly-received audio interaction data. In this manner, other components of system 300 may retrieve and manipulate the stored audio interaction data. In some implementations, audio interaction data is only stored temporarily, such as until one or more summaries are generated, to prevent sensitive or private data from being retained. In some implementations, system 300 encrypts or otherwise secures the audio interaction data prior to being stored in interaction database 308. As mentioned above, audio interaction data can include a recording of the audio interaction generated by recorder 322; thus, in some implementations, audio interaction data includes an audio file of the recording (e.g., MP3, AAC, WMA, FLAC, OGG, PCM, etc.). In some implementations, audio interaction data may include text files of audio interactions that were transcribed by another device (e.g., recorder 322).

In implementations where audio interaction data is received and/or stored in the form of audio files, a transcription component 302 may be used to transcribe the audio data. Specifically, transcription component 302 may retrieve stored audio interaction data and/or may receive audio interaction data as it is provided to system 300 by external device, and may generate a transcription (e.g., text) of the audio interaction. Accordingly, transcription component 302 may include any suitable speech-to-text or natural language processing (NLP) model, such as a neural network, a deep feedforward neural network, a recurrent neural network, a hidden Markov model, etc. Once transcribed, transcription component 302 may store the transcription in interaction database 308 for later retrieval or may immediately send the transcription to other components of system 300, as described below.

In some implementations, transcription component 302 sends the transcription of the audio interaction to a keyword extraction component 304, which is configured to automatically extract keywords from text. In some implementations, keyword extraction component 304 retrieves transcribed audio interaction data from interaction database 308. In implementations where audio interaction data is transcribed by another device (e.g., recorder 322), and is thereby received in a textual format, keyword extraction component 304 may directly receive the transcribed audio interaction. In any case, keyword extraction component 304 may include any suitable NLP model for identifying and extracting keywords from a transcription of an audio interaction. In some implementations, the NLP model implemented by keyword extraction component 304 is different from the NLP model implemented by transcription component 302. In other implementations, a single NLP model is used to both transcribe an audio interaction and simultaneously extract keywords, in which case the functionality of transcription component 302 and keyword extraction component 304 may be combined.

"Keywords" are, in generally, words or phrases in a text (e.g., the transcription of an audio interaction) that are either most relevant to the subject of the text or that are of interest to a user. For example, keywords may be the most prevalent words in the text or the most closely-related to the topic of the text, although the definition of "keywords" should not be limited to just these examples. As another example, keywords may be user defined; thus, keywords do not necessarily need to be extracted from transcribed audio interactions, in all cases. In some implementations, keywords are provided by users. Once extracted, keyword extraction component 304 may update a keyword database 310 with the identified keywords. In some implementations, keywords stored in keyword database 310 may be mapped to corresponding audio interactions in interaction database 308. In some implementations, one or more keywords may be user-defined, in which case the user-defined keywords are received from external sources (e.g., remote devices 324). For example, a user of a user device (e.g., a personal computer) may enter one or more keywords that are relevant to the summaries they would like to generate. Taking this example further, a user associated with a particular unit in a business may define keywords related to the business unit, such that one or more of the summaries produced by system 300 is reflective of the user's preferences.

Still referring to FIG. 3, system 300 is shown to include a summarization component 314 that trains a summary model 316 to generate summaries of transcribed audio interactions based on the keywords stored in keyword database 310, and that deploys the trained summary model 316 to summarize audio interactions. In particular, summary model 316, once trained, may be provided (e.g., as inputs) with transcriptions of audio interactions and may produce (e.g., output) one or more candidate summaries of each audio interaction. In general, summary model 316 is a full transformer model, also called a "transformer," that is configured to receive text-based inputs (e.g., transcription) and provided text-based outputs (e.g., summarizations). In some implementations, summary model 316 is an mBART or mBART-50 model, although it should be appreciated that any other suitable transformer is considered herein (e.g., bidirectional encoder representations from transformers (BERT)). Transformers, like summary model 316, are designed to process sequential input data (e.g., natural language) and generally use an encoder-decoder architecture, as shown in FIG. 4, which is referenced herein in addition to FIG. 3.

Figure 4:
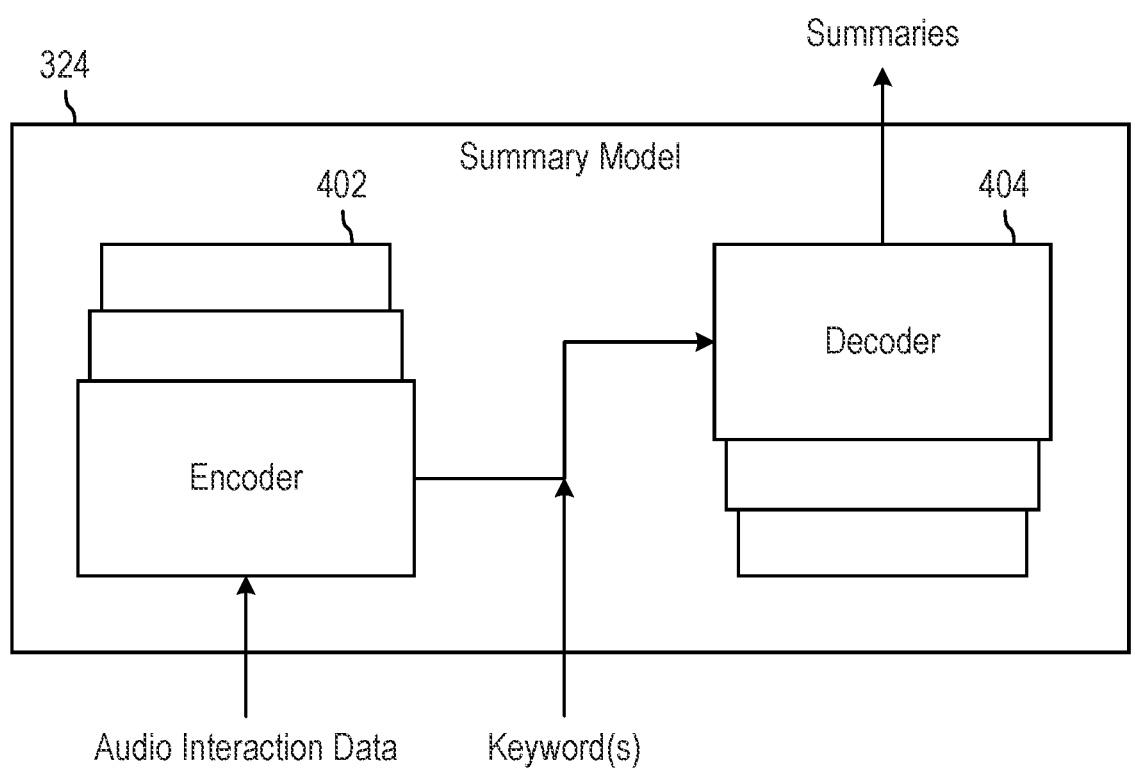
FIG. 4 is a detailed block diagram of the summary model implemented by the audio analysis system of FIG. 3, according to some implementations.

As shown in FIG. 4, for example, summary model 316 includes encoder layers 402 which iteratively process the input (e.g., the transcription of an audio interaction). In part, encoder layers 402 convert an input of summary model 316 to a vector. In this regard, encoder layers 402 are configured to generate vector representations of the transcription of the audio interaction. In some implementations, this process of vectorization is called embedding. Once processed by encoder layers 402, the vector representation of the audio interaction is passed to decoder layers 404 which translate the output of encoder layers 402 to generate one or more summaries. Unlike traditional transformers, summarization component 314 is configured to "inject" vectorized keywords between encoder layers 402 and decoder layers 404 of summary model 316, as shown in FIG. 4.

Specifically, keywords are injected as part of the training of summary model 316 by a training component 318. Generally, training component 318 is configured to both pretrain summary model 316 and, in some implementations can fine-tune summary model 316 after the model has been pretrained. In general, the pretraining of any transformer model, such as summary model 316, may require large amounts of data, which are processed by the model to adjust model parameters (e.g., weights) to minimize error in output values. In the case of summary model 316, training component 318 may utilize a pre-made dialogue summarization dataset, such as DialogSum, which consists of hundreds of dialogues (e.g., interactions) and corresponding manually labelled summaries and topics (e.g., keywords).

It may be appreciated that many available datasets, including DialogSum, are not necessarily sufficient to completely train summary model 316 for audio interactions. For example, audio data obtained from call center interactions and/or interactions between a customer and a customer service agent can be complex and focused on issues relating to a business or product. Additionally, many example dialogues in available datasets are much shorter in length than typical audio interactions. However, using the keyword injection technique described herein, training component 318 can train summary model 316 to generate accurate and user- or business-specific summaries with pseudo-labelled data based on one or more keywords. In other words, keyword injection allows summary model 316 to be trained/fine-tuned without using a labelled dataset.

In some implementations, keyword injection begins with the keyword(s) being vectorized or embedded by encoder layers 402. In other implementations, the keyword(s) are converted to vectors by summarization component 314. The vectorized keyword(s) are then concatenated with the vector representation of the transcription and the resulting string is fed to decoder layers 404 to generate a summary. From there, training component 318 fine-tunes summary model 316 to produce summaries that are reflective of the injected keywords. In some implementations, injection is a process of averaging the vectorized keywords. In some implementations, summarization component 314 can further adjust a "temperature" value for summary model 316. Temperature is a parameter of neural network-based transformers that determines an amount of randomness in the output. By adjusting temperature, summarization component 314 can generate a plurality of different candidate summaries for consideration.

Once trained, summary model 316 can be deployed for use in producing summaries of audio interactions. "Deploying" summary model 316 can include, for example, system 300 utilizing summary model 316 to generate summaries of subsequent audio interaction (e.g., other than those used to train summary model 316). In some implementations, summary model 316 is activated after training. In some implementations, "deploying" summary model 316 includes transmitting a copy of summary model 316 to various client device (e.g., remote device(s) 324) for use. For example, summary model 316 may be trained on a first computing device and transmitted to various other computing devices for use. In some implementations, summary model 316 is published to a database or repository after training, or otherwise made available to be accessed/downloaded by various client devices. For example, system 300 may train and host summary model 316, which can be remotely accessed by client devices for use.

In some implementations, summarization component 314 may generate multiple summaries for a given audio interaction using trained summary model 316. The generated summaries may then be stored in summary database 312 for additional manipulation or further future access. In some implementations, a scoring component 306 obtains the multiple generated summaries and determines a score for each of the summaries. In some such implementations, scoring component 306 receives the summaries directly from summarization component 314 or retrieves the summaries from summary database 312. In some configurations, although not shown in FIG. 3, scoring component 306 may be a component of summarization component 314. In any case, scoring component 306 may determine a score indicating the accuracy of each summarization and/or providing various other metrics relating to each summarization. In some implementations, scoring component 306 evaluates each summary using a Recall-Oriented Understudy for Gisting Evaluation (ROUGE) technique, which is a measurement of each summaries' accuracy. In some implementations, only summaries with a score that meets or exceeds a threshold are presented to users (e.g., by transmitting to remote devices 324 or presenting via user interfaces).

In some implementations, system 300 further includes a user interface (UI) generation component 320 for generating various user interfaces. Specifically, UI generation component 320 can generate graphical user interfaces (GUIs) to present data, including the summaries generated by summarization component 314. In some implementations, UI generation component 320 can generate GUIs that include text, graphs, graphics, charts, interactive elements, and the like. In some implementations, the GUIs generated by UI generation component 320 are transmitted to various user devices (e.g., remote devices 324), which cause the various user devices to display the GUIs. In some implementations, system 300 includes a user interface (not shown) for displaying GUIs and other information. The user interface generally includes a screen (e.g., an LED or LCD screen) for displaying GUIs. In some implementations, the user interface includes one or more devices that allow a user to interact with system 300, such as a mouse, a keyboard, a keypad, a touchscreen, etc.

Figure 5:
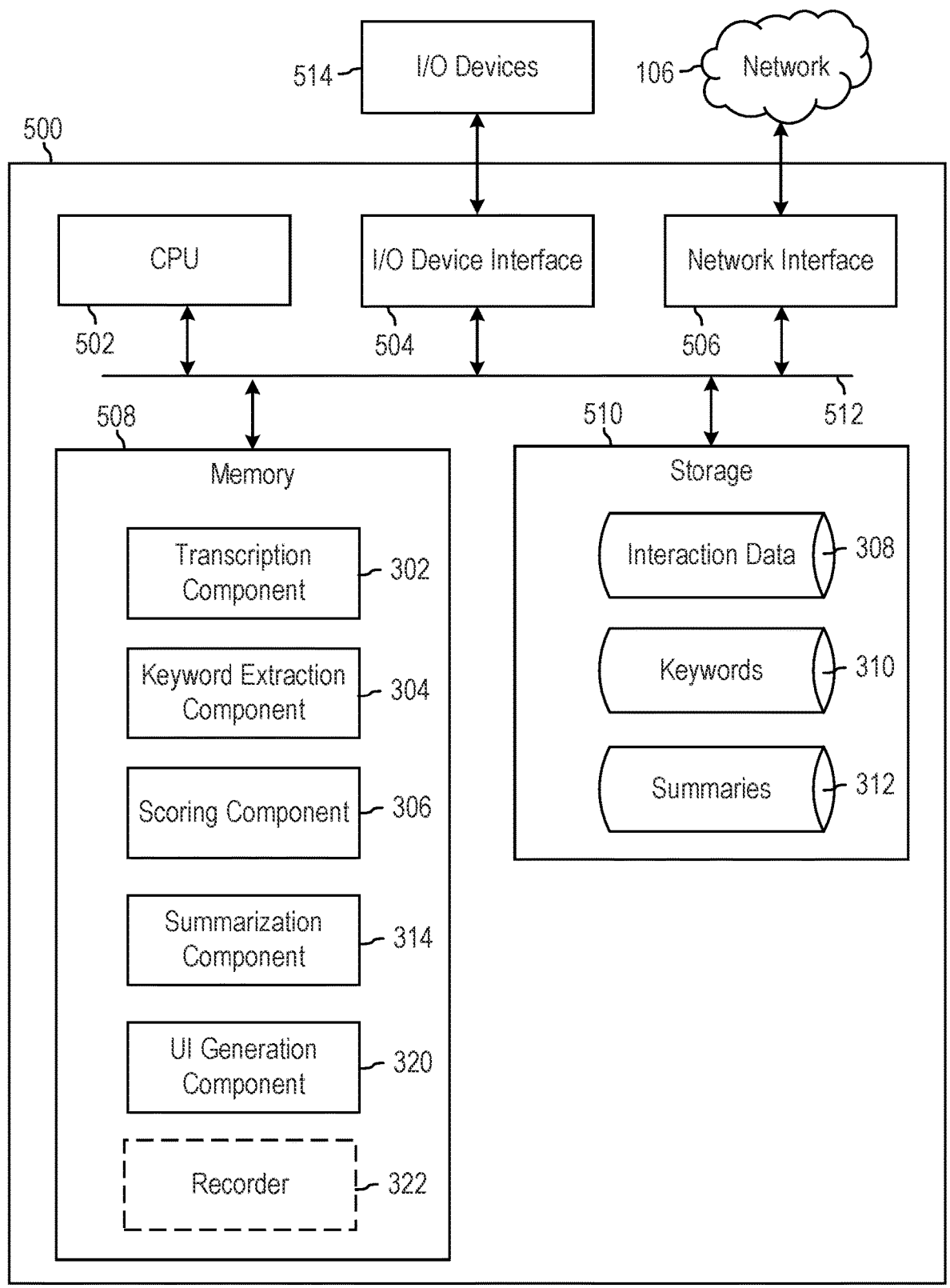
FIG. 5 is a block diagram of an example computing system that may be utilized to implement the audio analysis system of FIG. 3, according to some implementations.

Referring now to FIG. 5, is a block diagram of an example computing system 500 that may be utilized to implement the audio analysis system of FIG. 3, according to some implementations. Generally, computing system 500 may include the kinds of software programs, data stores, and hardware that can implement the various processes and features of audio analysis system 300, as described above. Accordingly, computing system 500 may be any suitable computing device, such as a laptop or desktop computer, a server, a smartphone, etc. In some implementations, computing system 500 is a cloud server that hosts system 300. As shown, computing system 500 includes, without limitation, a central processing unit (CPU) 502, a network interface 506, a memory 508, and storage 510, each connected to a bus 512.

As described herein, CPU 502 can be any general-purpose processor, an application specific integrated circuit (ASIC), one or more field programmable gate arrays (FPGAs), a group of processing components, or other suitable electronic processing components. In some embodiments, CPU 502 is configured to execute program code stored on memory 508 to cause computing system 500 to perform one or more operations. Memory 508 can include one or more devices (e.g., memory units, memory devices, storage devices, etc.) for storing data and/or computer code for completing and/or facilitating the various processes described in the present disclosure. In some implementations, memory 508 includes tangible, computer-readable media that stores code or instructions executable by CPU 502.

Tangible, computer-readable media refers to any media that is capable of providing data that causes the system 300 (e.g., a machine) to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 508 can include random access memory (RAM), read-only memory (ROM), hard drive storage, temporary storage, non-volatile memory, flash memory, optical memory, or any other suitable memory for storing software objects and/or computer instructions. Memory 508 can include database components, object code components, script components, or any other type of information structure for supporting the various activities and information structures described in the present disclosure. In some implementations, memory 508 be communicably connected to CPU via bus 512. Likewise, storage 510 can include one or more devices (e.g., memory units, memory devices, storage devices, etc.) for maintaining data. As shown, CPU 502 may access the data in storage 510 via bus 512.

While shown as individual components, it will be appreciated that CPU 502, memory 508, storage 510, and/or computing system 500 can be implemented using a variety of different types and quantities of processors and memory. For example, CPU 502 may represent a single processing device or multiple processing devices. Similarly, memory 508 may represent a single memory device or multiple memory devices. Additionally, in some implementations, computing system 500 may be implemented within a single computing device (e.g., one server, one housing, etc.). In other implementations, computing system 500 may be distributed across multiple servers or computers (e.g., that can exist in distributed locations). For example, computing system 500 may include multiple distributed computing devices (e.g., multiple processors and/or memory devices) in communication with each other that collaborate to perform operations. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. For example, virtualization software may be employed by computing system 500 to provide the functionality of a number of servers that is not directly bound to the number of computers in computing system 500.

As shown, memory 508 can include transcription component 302, keyword extraction component 304, scoring component 306, summarization component 314, UI generation component 320, and (optionally) recorder 322, all of which are described above. Storage 510 generally includes interaction database 308, keywords database 310, and summaries database 312, all of which are also described above. Thus, for the sake of brevity, the functionality of the various components of memory 508 and storage 510 is not repeated; instead, reference is made back to FIG. 3, above.

In some implementations, an input/output (I/O) device interface 504 allows various I/O devices 514 to communicate with computing system 500. In some implementations, I/O devices 514 include one or more of recorder 322, remote device(s) 324, user interface components (e.g., a screen, a user input device, etc.). Specifically, I/O device interface 504 can facilitate the communication of data from/to I/O devices 514. In some implementations, I/O device interface 504 can be or can include any suitable wired or wireless communications interface (e.g., jacks, antennas, transmitters, receivers, transceivers, wire terminals, etc.) for conducting data communications. Likewise, a network interface 506 can be or can include any suitable wired or wireless communications interface (e.g., jacks, antennas, transmitters, receivers, transceivers, wire terminals, etc.) for conducting data communications with network 106. For example, network interface 506 can include a wireless transceiver or Ethernet jack to enable communications. In some implementations, computing system 500 communicates with recorder 322 and/or remote device(s) 324, as described above, via network interface 506.

Model Training

Figure 6:
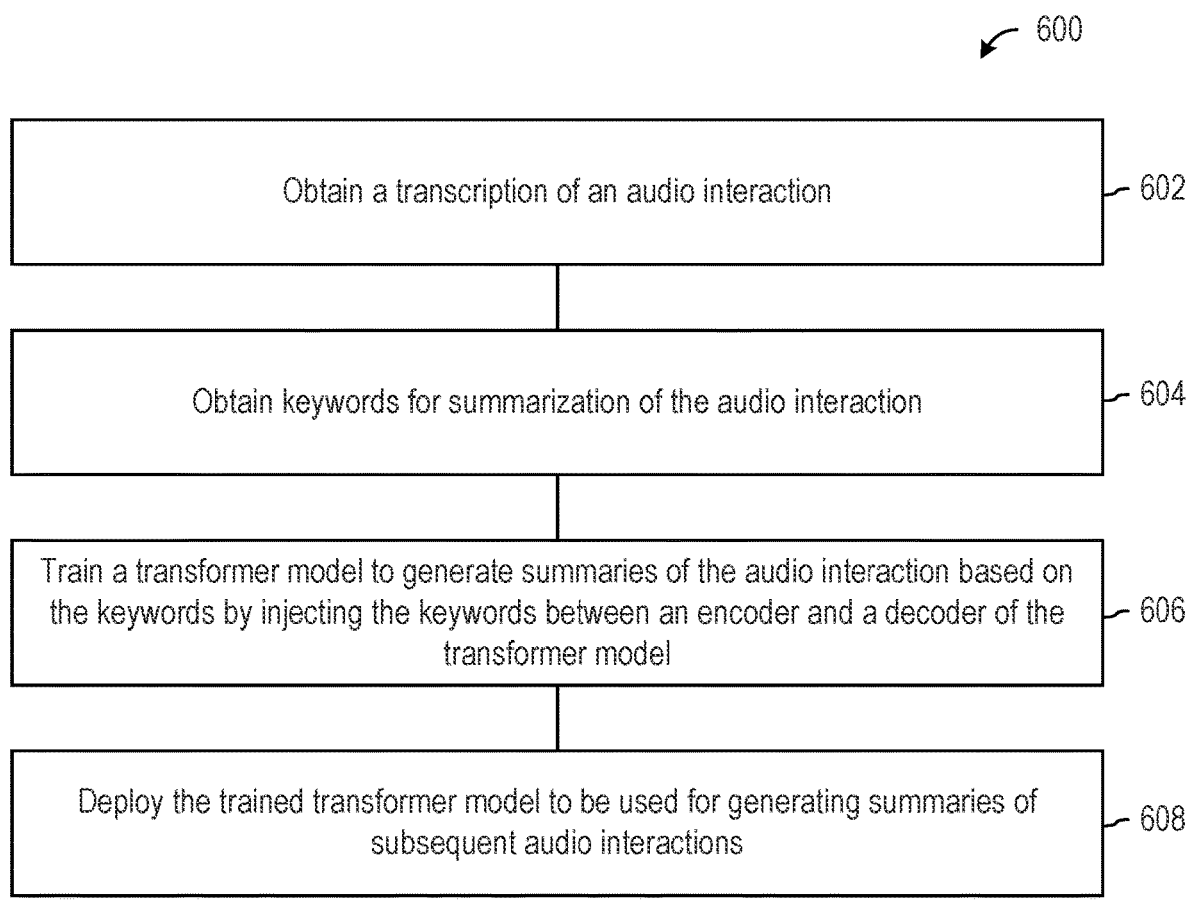
FIG. 6 is a flow diagram of a process for training a transformer model to generate tailored summaries, according to some implementations.

Referring now to FIG. 6, a flow diagram of a process 600 for training summary model 316 is shown, according to some implementations. In particular, process 600 may be implemented to initially train summary model 316 and/or to update or fine-tune summary model 316. In some implementations, process 600 is implemented by system 300, as described above, although it should be appreciated that all of process 600, or certain operations of process 600, may be performed by other computing devices. It will also be appreciated that certain operations of process 600 may be optional and, in some implementations, process 600 may be implemented using less than all of the operations. Further, the order of operations of process 600 shown in FIG. 6 is not intended to be limiting.

At block 602, a transcription of an audio interaction is obtained by summarization component 314. In some implementations, the transcription is obtained by system 300 from an external device, such as recorder 322. In some such implementations, recorder 322 is configured to both record and transcribe the audio interaction, which is then sent to system 300. In some implementations, as mentioned above, recorder 322 may be a component of system 300, in which case system 300 may intercept audio data for an audio interaction and may record the audio interaction using recorder 322. In some implementations, recorder 322 is only configured to record audio interaction, rather than to record and transcribe the interaction, in which case the recorded audio interaction is received by transcription component 302 for transcribing. Subsequently, transcription component 302 may store the transcribed audio interaction in interaction database 308 and/or may send the transcribed audio interaction to keyword extraction component 304 and/or summarization component 314. In other implementations, the transcription is received or retrieved from a dataset of transcribed audio interactions, sometimes referred to as a dialog summarization (DialogSum) dataset. The dialog summarization dataset generally contains a number of previously transcribed audio interactions, and may include previously-generated summaries of the included audio interactions.

At block 604, keywords for summarization of the audio interaction are obtained by summarization component 314. In some implementations, the keywords are identified by keyword extraction component 304. In some such implementations, keyword extraction component 304 may analyze the transcription of the audio interaction using an NLP model in order to identify keywords and phrases. In other words, keyword extraction component 304 may extract keywords from the transcription. In some implementations, the keywords are received as user inputs. For example, a user of system 300 or one or more users of remote devices 324 may enter various keywords in order to tailor summaries of audio interactions based on their preferences. In some such implementations, user-defined keywords may be stored in a keywords database 310. Similarly, keywords extracted by keyword extraction component 304 may be stored in keywords database 310. In some cases, automatically identified keywords may be mapped to their associated transcription for training of summary model 316.

At block 606, a transformer model (e.g., summary model 316) is trained (e.g., by training component 318) to generate summaries of the audio interaction based on the keywords. Notably, to train the transformer model, the keywords obtained at block 604 are injected between an encoder and a decoder of the transformer model. This "injection" takes place as the transformer model is processing an input transcription, such that the resulting summary is tailored for the injected keyword(s). In some implementations, injecting the keyword(s) first includes encoding the keywords and/or the transcription (e.g., by summarization component 314). Generally, "encoding" refers to the conversion of the keyword(s) and transcription into vector formats (e.g., vectorization). In some implementations, the transcription of the audio interaction is provided as an input to summary model 316 which, as described above, is a transformer model such that summary model 316 itself generates the vector representation of the transcription. In some implementations, the keyword(s) are also converted into vectors by the encoding portion of summary model 316. In other implementations, the keyword(s) are converted into vectors separately, such as by summarization component 314.

Subsequently, the encoded keyword(s) are concatenated with the transcribed audio interaction data by summarization component 314. In other words, the vectorized keyword(s) are "injected" between the encoder and decoder of summary model 316. Specifically, the vector representations of each keyword may be appended to the beginning or end of the vector representation of the transcription. In some implementations, block 606 further or alternatively includes averaging of the encoded keyword(s) and transcribed audio interaction data. In some implementations, each keyword may be separately concatenated to the transcribed audio interaction data and processed to generate one or more summaries.

In some implementations, block 606 of process 600 is repeated using different keywords to generate multiple trained transformer models. For example, multiple copies of summary model 316 (e.g., or another transformer model) may be trained for unique keywords, such that each trained model produces summaries of transcribed audio interactions based on a respective keyword. In this manner, multiple different summaries may be generated for a given audio interaction. In some implementations, the transformer model is trained multiple times using different settings or parameters. For example, the temperature value or number of beams associated with the transformer can be modified with each training cycle to produce different trained models, or to determining settings/parameters that result in the most accurate summaries.

At block 608, the trained transformer model (e.g., summary model 316) is deployed to be used for generating summaries of subsequent audio interactions. As described above with respect to FIG. 3, "deploying" the transformer model (e.g., summary model 316) can include, for example, system 300 utilizing summary model 316 to generate summaries of subsequent audio interaction (e.g., other than those used to train summary model 316). In some implementations, deploying the transformer model simply includes activating the trained model for use. In some implementations, deploying the transformer model includes transmitting a copy or multiple different versions of the trained transformer model to various client device (e.g., remote device(s) 324) for use. In some implementations, the transformer model(s) is published to a database or repository after training, or otherwise made available to be accessed/downloaded by various client devices. For example, system 300 may train and host summary model 316, which can be remotely accessed by client devices for use. In implementations where the trained transformer model(s) are distributed to remote devices for use, each remote device may be configured to use the trained transformer model(s) to produce summaries of locally-obtained audio interactions.

Audio Interaction Summarization

Figure 7:
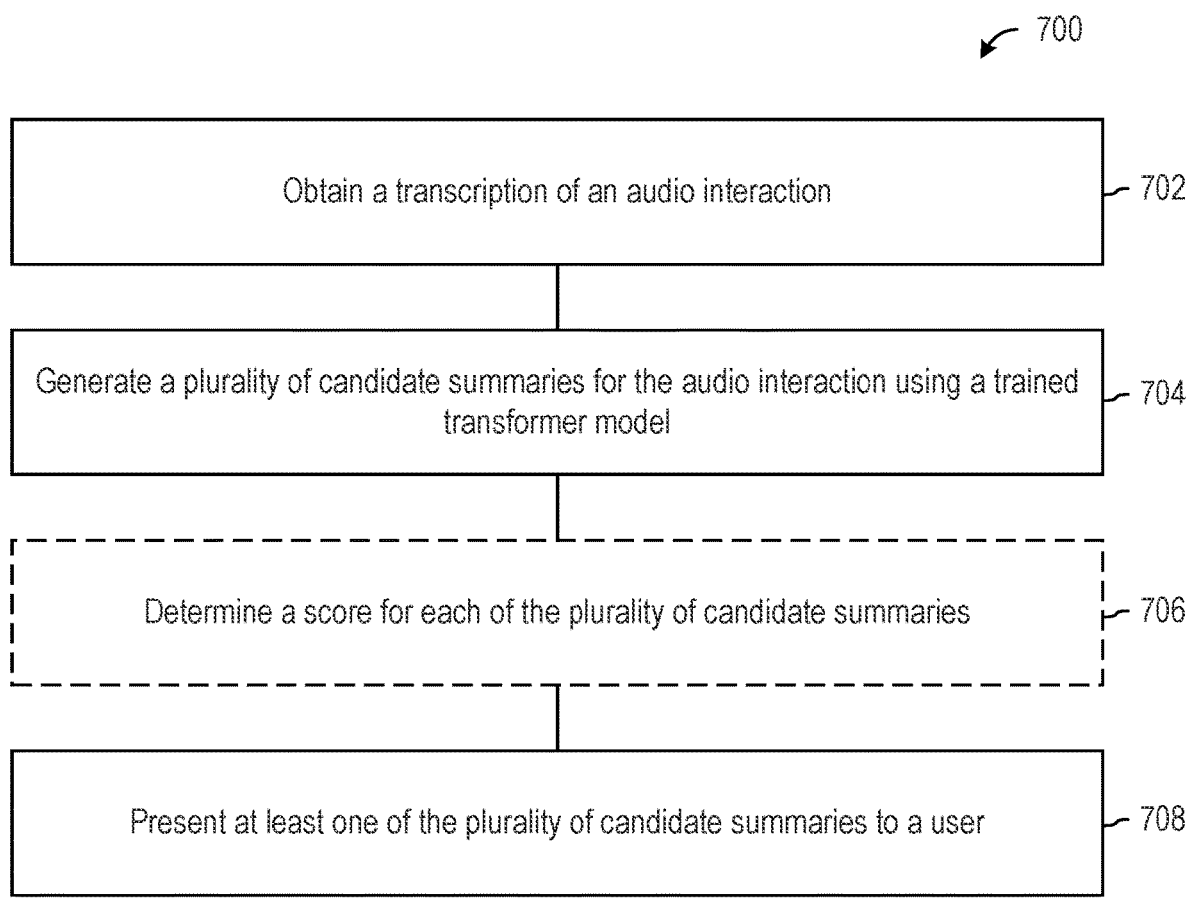
FIG. 7 is a flow diagram of a process for generating summaries of audio interactions, according to some implementations.

Referring now to FIG. 7, a flow diagram of a process 700 for generating summaries of audio interactions is shown, according to some implementations. In some implementations, process 700 is implemented by system 300, as described above, although it should be appreciated that all of process 700, or certain operations of process 700, may be performed by other computing devices. For example, as described below, summary model 316 may be distributed to various client devices after training such that the various client devices perform the operations of process 700. It will also be appreciated that certain operations of process 700 may be optional and, in some implementations, process 700 may be implemented using less than all of the operations. Further, the order of operations of process 700 shown in FIG. 7 is not intended to be limiting.

At block 702, transcribed audio interaction data is obtained (e.g., by summarization component 314). In some implementations, a transcription of an audio interaction is obtained by system 300 from an external device, such as recorder 322. In some such implementations, recorder 322 is configured to both record and transcribe the audio interaction, which is then sent to system 300. In some implementations, as mentioned above, recorder 322 may be a component of system 300, in which case system 300 may intercept audio data for an audio interaction and may record the audio interaction using recorder 322. In some implementations, recorder 322 is only configured to record audio interaction, rather than to record and transcribe the interaction, in which case the recorded audio interaction is received by transcription component 302 for transcribing. Subsequently, transcription component 302 may store the transcribed audio interaction in interaction database 308 and/or may send the transcribed audio interaction to keyword extraction component 304 and/or summarization component 314.

At block 704, a plurality of candidate summaries are generated (e.g., by summarization component 314) for the audio interaction using a trained transformer model (e.g., summary model 316) or multiple trained transformer models. In some implementations, the transformer model(s) are trained according to process 600, described above; thus, for the sake of brevity, the training process is not redescribed here. For example, in some implementations, the trained transformer model(s) may be received by client devices that then generate the candidate summaries. Alternatively, or additionally, system 300 may utilize the trained transformer model(s) to generate candidate summaries. In any case, the transcription of the audio interaction may be provided as an input to the trained transformer model(s). In some implementations, a single trained transformer model is executed and produces multiple candidate summaries. In some such implementations, parameters (e.g., temperature, beam value, etc.) of the trained transformer model are modified between each generated summary to vary the output of the trained transformer model. In some implementations, as mentioned above with respect to FIG. 6, multiple versions of the transformer model are trained using different keywords, such that each version of the transformer model produces a different summary based on its associated keyword. As described herein, each summary generated at block 704 is considered a "candidate" summary.

At block 706, a score is optionally determined for each of the plurality of candidate summaries (e.g., by scoring component 306). As described above, scoring component 306 may determine a score indicating the accuracy, and/or relevance to the associated keyword, of each summarization. Additionally, various other metrics relating to each summarization can be generated, such as overlap of n-grams, longest common sequence, etc. In some implementations, scores are generated using ROUGE. In some implementations, only summaries with a score that meets or exceeds a threshold are presented to users at block 708, described below. For example, only summaries with an accuracy or relevance score above 75% may be selected for display. In some implementations, only summaries that contain the highest number of respective keywords are identified to be presented to users.

At block 708, at least one of the plurality of candidate summaries is presented to a user. In some implementations, a limited number of candidate summaries are selected for presentation based on their respective scores, determined at block 706. In other implementations, every candidate summary generated at block 704 is presented to the user(s). In some implementations, candidate summaries are transmitted (e.g., via network interface 506) to one or more client devices operated by one or more users (e.g., remote devices 324). In some such implementations, receiving a summary or multiple summaries can cause the user device(s) to generate and present a user interface to display the summaries. For example, the user interface may display textual and/or graphical representations of the summaries. In some implementations, UI generation component 320 generates and transmits user interfaces that present the summaries. In some implementations, the one or more summaries are presented via a user interface of computing system 500 (e.g., one of I/O devices 514).

In some implementations, process 700 may further include receiving user inputs to modify the presented candidate summaries. For example, a user may change, replace, remove, or otherwise manipulate words in one or more summaries to fix mistakes or adjust the summary based on their preferences. In such implementations, the user feedback may be used to fine-tune the trained transformer model(s) (e.g., summary model 316). For example, parameters of the trained transformer model(s) may be adjusted to improve their respective outputs and/or the trained transformer model(s) may be completely retrained based on the user inputs. In some implementations, process 700 is iteratively or continuously repeated to generate summaries for different audio interactions.

In some implementations, one or more candidate summaries generated at block 704 and/or selected at block 706 may be feed back into the trained transformer model(s) to generate additional candidate summaries. In other words, process 700 may be repeated, however, the transcription obtained at block 702 may be replaced with one or more of the generated candidate summaries. In some such embodiments, generating a second set of candidate summaries based on a first set of candidate summaries results in one or both of abstractive summaries and extractive summaries. In other words, the candidate summaries produced on a first execution of process 700 may be utilized to generate abstractive and/or extractive summaries.

Configuration of Certain Implementations

The construction and arrangement of the systems and methods as shown in the various exemplary implementations are illustrative only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method may be varied or re-sequenced according to alternative implementations. Other substitutions, modifications, changes, and omissions may be made in the design, operating conditions, and arrangement of the exemplary implementations without departing from the scope of the present disclosure.

The present disclosure contemplates methods, systems, and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of operation of the example method, the order of operation may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection operations, processing operations, comparison operations and decision operations.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or operations. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of implementations of the disclosed methods.

What is claimed is:

1. A system comprising:
one or more processors; and
memory having instructions stored thereon that, when executed by the one or more processors, cause the system to:
obtain a transcription of an audio interaction;
obtain keywords for summarizing the audio interaction;
train a transformer model to generate summaries of the audio interaction based on the keywords and the transcription, wherein the transcription is an input to the transformer model and the keywords are vectorized and injected between an encoder and a decoder of the transformer model such that the generated summaries are tailored in accordance with the vectorized keywords; and deploy the trained transformer model to be used for generating summaries of subsequent audio interactions.

2. The system of claim 1, wherein the keywords are extracted from the transcription using an extraction model.

3. The system of claim 1, wherein the keywords are received as a user input.

4. The system of claim 1, wherein the encoder of the transformer model converts the transcription and the keywords into vectors, and wherein injecting the keywords between the encoder and the decoder comprises concatenating vector representations of the keywords with a vector representation of the transcription.

5. The system of claim 1, wherein the transcription is obtained by:

capturing audio data during the audio interaction; and providing the audio data as an input to a natural language processing (NLP) model, wherein NLP model outputs the transcription.

6. The system of claim 1, wherein the transcription is obtained from a dialog summarization dataset.

7. The system of claim 1, wherein deploying the trained transformer model comprises transmitting a copy of the trained transformer model to a remote client device, wherein the remote client device uses the trained transformer model to:

generate a plurality of candidate summaries for a subsequent audio interaction; and present at least one the plurality of candidate summaries to a user of the remote client device.

8. The system of claim 1, wherein the transformer model is a mBART model.

9. A method comprising:

obtaining a transcription of an audio interaction;

obtaining keywords for summarizing the audio interaction;

training a transformer model to generate a summary of the audio interaction based on the keywords and the transcription, wherein the transcription is an input to the transformer model and the keywords are vectorized and injected between an encoder and a decoder of the transformer model such that the summary of the audio interaction is tailored in accordance with the vectorized keywords; and deploying the trained transformer model to be used for generating summaries of subsequent audio interactions.

10. The method of claim 9, wherein the keywords are extracted from the transcription using an extraction model.

11. The method of claim 9, wherein the keywords are received as a user input.

12. The method of claim 9, wherein the encoder of the transformer model converts the transcription and the keywords into vectors, and wherein injecting the keywords between the encoder and the decoder comprises concatenating vector representations of the keywords with a vector representation of the transcription.

13. The method of claim 9, wherein the transcription is obtained by:

capturing audio data during the audio interaction; and providing the audio data as an input to a natural language processing (NLP) model, wherein NLP model outputs the transcription.

14. The method of claim 9, wherein the transcription is obtained from a dialog summarization dataset.

15. The method of claim 9, wherein deploying the trained transformer model comprises transmitting a copy of the trained transformer model to a remote client device, wherein the remote client device uses the trained transformer model to:

generate a plurality of candidate summaries for a subsequent audio interaction; and present at least one the plurality of candidate summaries to a user of the remote client device.

16. The method of claim 9, wherein the transformer model is a mBART model.

17. A method of summarizing audio interaction, the method comprising:

obtaining a transcription of an audio interaction;

generating a plurality of candidate summaries for the audio interaction using a trained transformer model, wherein the transformer model is trained to generate the plurality of candidate summaries based on keywords that are vectorized and injected between an encoder and a decoder of the transformer model such that the candidate summaries are tailored in accordance with the vectorized keywords; and presenting at least one of the plurality of candidate summaries to a user.

18. The method of claim 17, further comprising generating one of an abstractive or extractive summary of the audio interaction by providing the at least one of the plurality of candidate summaries as an input to the trained transformer model.

19. The method of claim 17, further comprising generating a score for each of the plurality of candidate summaries, wherein the at least one of the plurality of candidate summaries presented to the user includes any of the plurality of candidate summaries that meet or exceed a threshold score.

20. The method of claim 19, wherein the score is generated using a Recall-Oriented Understudy for Gisting Evaluation (ROUGE) scoring method.

* * * * *